United States Patent
Fitch et al.

[11] 3,851,709
[45] Dec. 3, 1974

[54] HYDRAULIC FRACTURING METHOD TO CONTROL VERTICAL FRACTURE HEIGHTS

[75] Inventors: John L. Fitch; Lucien Massé; William L. Medlin, all of Dallas, Tex.; Maurice A. Biot, Brussels, Belgium

[73] Assignee: Mobil Oil Corporation, New York, N.Y.

[22] Filed: Nov. 21, 1973

[21] Appl. No.: 417,846

[52] U.S. Cl. .................................. 166/308
[51] Int. Cl. ................................... E21b 43/26
[58] Field of Search ............... 166/308, 283, 280

[56] References Cited
UNITED STATES PATENTS

| | | | |
|---|---|---|---|
| 3,181,612 | 5/1965 | West et al. | 166/283 |
| 3,372,752 | 3/1968 | Prater | 166/280 |
| 3,428,129 | 2/1969 | Cook | 166/308 X |
| 3,586,105 | 6/1971 | Johnson et al. | 166/308 X |
| 3,642,068 | 2/1972 | Fitch et al. | 166/308 X |
| 3,687,203 | 8/1972 | Malone | 166/308 |
| 3,709,300 | 1/1973 | Pye | 166/308 X |

*Primary Examiner*—Stephen J. Novosad
*Attorney, Agent, or Firm*—A. L. Gaboriault; Henry L. Ehrlich

[57] ABSTRACT

This specification discloses a method of hydraulically fracturing a subterranean earth formation to form therein a vertically disposed fracture. More particularly, this specification discloses a method of controlling the height of the formed vertically disposed fracture such that the fracture does not extend into formations that are superjacent or subjacent to the subterranean formation. Hydraulic pressure is applied via a well to the formation to initiate a vertical fracture therein. The hydraulic pressure is then reduced to a pressure no greater than a predetermined pressure and the vertically disposed fracture is propagated into the subterranean formation.

4 Claims, 2 Drawing Figures

3,851,709

HYDRAULIC FRACTURING METHOD TO CONTROL VERTICAL FRACTURE HEIGHTS

BACKGROUND OF THE INVENTION

This invention is directed to a method of fracturing a subterranean earth formation from a well penetrating the formation. More specifically, this invention is directed to a method of controlling the height of a vertically disposed fracture that is formed in the subterranean formation by a hydraulic fracturing technique.

Techniques for hydraulically fracturing subterranean formations have been described in the prior art. Generally in accordance with these techniques, a hydraulic fluid is pumped down a well and into contact with the formation. Hydraulic pressure is applied in a sufficient amount to the formation to fracture the formation and thereafter fluid is pumped into the fracture to propagate the fracture into the formation. It is generally accepted that in relatively deep formations the fractures that are formed are vertically disposed fractures and are commonly referred to as vertical fractures.

Hydraulic fracturing techniques have been extensively used for treating subterranean hydrocarbon-bearing formations. However, certain problems have arisen in conjunction with these techniques. One such problem results from the vertical extension of the fracture into formations which are either superjacent or subjacent to the subterranean formation being fractured. When, for example, a gas-bearing formation overlies a liquid hydrocarbon-bearing formation or a water-bearing formation underlies a liquid hydrocarbon-bearing formation, it is undesirable for the fracture to extend vertically into either the gas-bearing or water-bearing formation. Such a vertical extension of the fracture into either of these overlying or underlying formations opens undesirable flow channels thereinto and allows an undesirable flow of fluids from the overlying or underlying formations into the vertical fracture.

Various methods have been proposed for counteracting the undesirable flow of fluids from adjacent formations that are penetrated by a vertical fracture. For example, in U.S. Pat. No. 3,428,129, there is described a method of fracturing a subterranean formation penetrated by a well to limit the downward fracture propagation. A fracturing fluid is employed which includes a material responsive within the formation to form a precipitate of a greater density than the fracturing fluid so that the precipitate tends to settle to the lower part of the fracture.

When fracturing a calcareous formation, the fracturing fluid may comprise a sulfuric acid. The sulfuric acid in reacting with the calcareous formation forms a calcium sulfate precipitate which settles to the lower part of the fracture. In U.S. Pat. No. 3,181,612, the problem of water intrusion into an oil-producing stratum due to the extension of hydraulically formed fractures into the water-containing portion of a formation is recognized. It is there pointed out that no effective means or method is known to restrict or limit the cracks or fissures produced during the fracturing operation to the oil-producing horizons and thereby prevent their extension into adjacent water zones.

It is further pointed out that this is particularly serious in the case of more-or-less vertical fractures which are frequently formed during fracturing and which provide communication between oil and water strata lying superjacent or subjacent to each other. In accordance with the teachings of U.S. Pat. No. 3,181,612, these problems are combatted by admixing with an oil-base fracturing liquid a polyurethane polymer which is substantially insoluble in water but which is swellable upon contact with water and not swellable upon contact with an oil. The oil-base composition containing the polymer is injected down a well penetrating an oil- or gas-bearing stratum and back into the formation where at least a portion of the polymer remains so located that intruding waters upon entering the oil-producing stratum will come in contact with the polymer and thereby be inhibited from further intrusion into the oil- or gas-bearing stratum.

SUMMARY OF THE INVENTION

This invention is directed to a method of fracturing a subterranean formation that is located adjacent another formation having different mechanical characteristics. An initiation hydraulic pressure is applied to the subterranean formation to initiate a vertical fracture therein. The initiation pressure is reduced to a propagation pressure that is no greater than a predetermined pressure defined by the relationship $$P_2 = W_0 E / 4(1 - \nu^2) L \sqrt{a_2 G_2 / a_1 G_1}$$

where:
- $P_2$ = the predetermined propagation pressure which if not exceeded will limit the vertical extension of the fracture to the subterranean formation;
- $w_0$ = the maximum width of the fracture in the subterranean formation;
- $E$ = Young's modulus:
- $\nu$ = Poisson's ratio in the subterranean formation;
- $L$ = the thickness or length in a vertical direction of the subterranean formation;
- $a$ = fracture surface energy; energy required to generate unit of new surface by fracturing; (subscript 1 refers to the subterranean formation, subscript 2 refers to the other formation)
- $G$ = shear modulus (subscript 1 refers to the subterranean formation, subscript 2 refers to the another formation).

The propagation pressure is applied iva the well to the subterranean formation to propagate the vertically disposed fracture into the subterranean formation.

DESCRIPTION OF THE PREFERRED EMBODIMENTS

This invention is directed to a method of hydraulically fracturing a subterranean formation and, in particular, to forming a vertical fracture therein and controlling the vertical extension of the fracture such that the fracture is contained within the subterranean formation.

Figure 1:
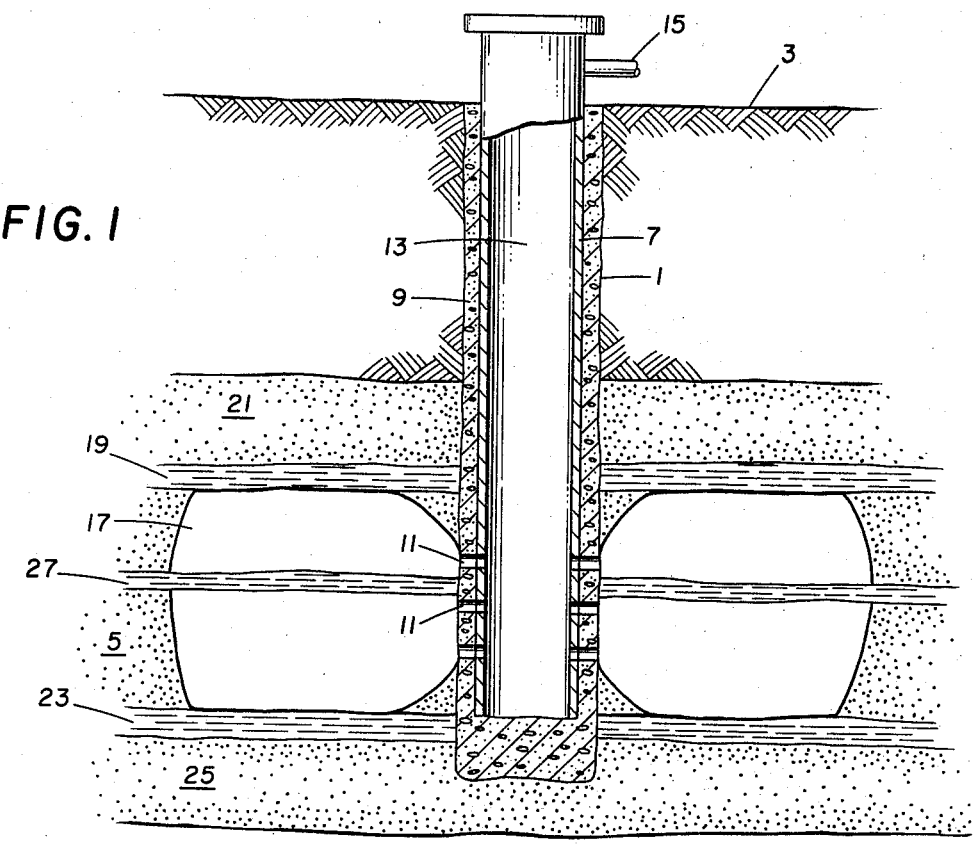
FIG. 1 is a view partially in cross section of a well penetrating a subterranean formation which figure illustrates this invention.

For a description of this invention, reference is made to FIG. 1 where there is shown a well 1 which extends from thesurface of the earth 3 and penetrates a subterranean formation 5 which may be, for example, a liquid hydrocarbon-bearing formation. The subterranean formation 5 may be bounded above by a shale layer 19 and bounded below by a shale layer 23 which separates the subterranean formation 5 from a gas-bearing fomation 21 above and from a water-bearing formation 25 below. The subterranean formation 5 may also contain therein streaks 27 of material that have mechanical characteristics that differ from the subterranean formation 5. The well 1 may have a casing 7 which is cemented into place by a cement sheath 9. The well 1 may extend completely through the formation 5, in which case the lower portion thereof will usually be sealed as, for example, with cement as shown in the figure. Perforations 11 are provided through the casing 7 and cement sheath 9 to open communication between the interior of the well 1 and the subterranean formation 5. A hydraulic fracturing fluid 13 is introduced into the casing 7 via port 15 such that the hydraulic fracturing fluid communicates with the formation 5. Pressure is applied for example by a pump (not shown) to the hydraulic fluid 13 to fracture the formation and propagate therein a vertically oriented fracture 17. The pressure applied (which pressure may be controlled by controlling the rate at which the fracturing fluid is injected into the formation) for propagating the fracture 17 into the formation 5 is limited by a predetermined propagation pressure as described later.

In accordance with this invention, a fracturing fluid is injected into formation 5 at a selected propagation pressure that is less than a predetermined pressure which would be sufficient to extend the vertical fracture across the shale streak 19 or shale streak 23 but at a pressure sufficient to propagate the fracture within the formation 5. In accordance with an embodiment this selected propagation pressure is greater than another predetermined pressure which is sufficient to extend the vertical fracture across the streak of material 27. Thus, by this invention, the height of the vertical fracture 17 is controlled such that the fracture 17 is extended through the stratum 27 but is limited vertically to the thickness of the formation 5.

Figure 2:
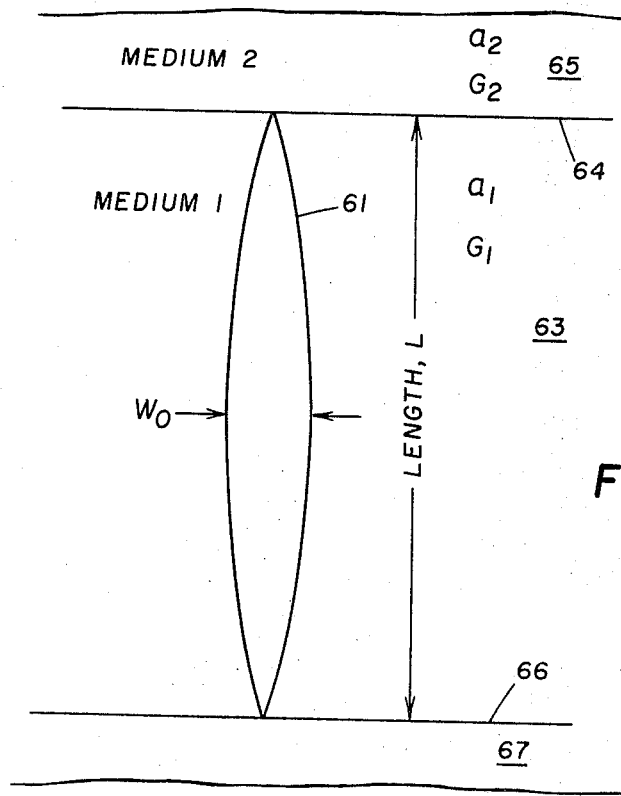
FIG. 2 is a cross-sectional view of a vertical fracture formed in a subterranean formation which further illustrates the method of this invention.

Referring to FIG. 2 there is shown for illustrative purposes a cross-sectional view of a vertical fracture 61 which extends across the entire thickness of a subterranean formation 63. A stratum 65 is located adjacent to and above the subterranean formation 63 and a stratum 67 is located adjacent to and below the subterranean formation 63. Strata 65 and 67 have mechanical characteristics that differ from those of formation 63. For simplicity in illustrating this invention, stratum 65 and stratum 67 are considered to have the same mechanical characteristics. Therefore, only one predetermined pressure need be determined to obtain the propagation pressure which will limit the fracture 61 to formation 63. It is to be understood however that if strata 65 and 67 have different mechanical characteristics, a predetermined pressure may be calculated for each stratum and the lesser pressure used to obtain the propagation pressure which will limit the fracture 61 to subterranean formation 63.

Now considering only subterranean formation 63 which is referred to as medium 1 and stratum 65 which is referred to as medium 2, the predetermined pressure required to extend the vertical fracture 61 across the interface 64 between subterranean formation 63 and stratum 65 is defined by the following relationship $$P_2 w_0 E / 4(1-\nu^2) \quad \sqrt{a_2 G_2 / a_1 G_1} \tag{1}$$

where:
- $P_2$ = the predetermined pressure to extend vertical fracture 61 from medium 1 into medium 2; or the predetermined propagation pressure which if not exceeded will limit the vertical extension of the fracture to the subterranean formation;
- $w_0$ = the maximum width of the fracture 61;
- $E$ = Young's modulus in medium 1;
- $\nu$ = Poisson's ratio in medium 1;
- $L$ = the thickness of medium 1 which is the height or length in a vertical direction of th vertical fracture 61;
- $a$ = fracture surface energy required to generate unit area of new surface by fracturing (subscripts 1 and 2 refer to the mediums 1 and 2, respectively); and
- $G$ = the shear modulus (subscripts 1 and 2 refer to the mediums 1 and 2, respectively).

The value of $w_0$ may be determined or estimated by methods previously described in the prior art. For example, one such method is described in Chapter IV, and more particularly by equations 4.7 and 4.23 on page 42 of Chapter IV, of "Hydraulic Fracturing" by G. C. Howard and C. R. Fast, Society of Petroleum Engineers of AIME, 1970. The shear modulus G may be determined from laboratory measurements of shear strain and shear stress according to the relation, $G = \tau/\gamma$ where $\tau$ = shear stress in pounds per square inch and $\gamma$ = shear strain in inches/inch. In practice a shear stress is applied to a specimen obtained from a core of reservoir rock and the resulting strain is measured by means of strain gages as described in Chapter XIII of "Strain Gage Techniques" by W. M. Murray and P. K. Stein, MIT Cambridge (1958). The surface energy $a$ may be determined by methods such as those described in the publication by T. K. Perkins and W. W. Krech, entitled "Effect of Cleavage Rate and Stress Level on Apparent Surface Energy of Rocks," SPE Journal (December, 1966) pp. 308–13. Young's modulus and Poisson's ratio are well known enginerring constants which are referred to and typical values given for formation rocks in "Hydraulic Fracturing" by G. C. Howard and C. R. Fast, Society of Petroleum Engineers of AIME, 1970, pp. 42–43, 14, 19, and 20.

Thus, in carrying out the method of this invention, the pressure used to propagate the vertical fracture is limited to a pressure that is no greater than the prdetermined pressure $p_2$ in order to limit the vertical extensio of the vertical fracture such that it does not cross the strata of material which lie adjacent the subterranean formation being fractured. The lower limit of the pressure which may be employed in carrying out the fracturing operation is that pressure which is just sufficient to propagate the vertical fracture into the subterranean formation being fractured. In the embodiment wherein the subterranean formation being fractured contains one or more strata therein having mechanical characteristics which differe fro the mechanical characteristics of the subterranean formation, the relationship (1) above may be used to calculate another predetermined pressure which is the pressure that must be exceeded in order to extend the vertical fracture across the strata within the subterranean formation. Thus, in accordance with a preferred embodiment, a selected propagation pressure is applied to propagate the vertical fracture into the subterranean formation, which selected propagation pressure is greater than the pressure that must be exceeded in order to extend the vertical fracture across the strata within the subterranean formation but less than the predetermined pressure $p_2$ which is the pressure which if not exceeded will limit the vertical extension of the fracture to the subterranean formation.

We claim:

1. A method of fracturing a subterranean formation that is located adjacent another formation having different mechanical characteristics, comprising the steps of:

a applying an initiation hydraulic pressure via said well to said subterranean formation to initiate in said subterranean formation a vertically disposed fracture;

b reducing said initiation pressure to a propagation pressure that is no greater than a predetermined pressure defined by the relationship $$p_2 = w_0 E / 4(L1 - \nu^2) \sqrt{a_2 G_2 / a_1 G_1}$$

where:

$p_2$ = the predetermined propagation pressure which f not exceeded will limit the vertical extension of the fracture to the subterranean formation;

$w_0$ = the maximum width of the fracture in the subterranean formation;

$E$ = Young's modulus in the subterranean formation;

$\nu$ = Poisson's ration i the subterranean formation;

$L$ = the thickness or length in a vertical direction of the subterranean formation;

$a$ = fracture surface energy; energy required to generate unit area of new surface by fracturing (subscript 1 refers to the subterranean formation, subscript 2 refers to the other formation).;

$G$ = shear modulus (subscript 1 refers to the subterranean formation, subscript 2 refers to the another formation); and c. applying said selected propagation pressure via said well to said subterranean formation to propagate said vertically disposed fracture into said subterranean formation.

2. The method of claim 1 wherein said another formation is a subjacent formation.

3. The method of claim 2 wherein said subterranean formation is also bounded by a superjacent formation further comprising the steps of:

a. determining a first predetermined pressure based upon said subterranean formation and said subjacent formation;

b. determining a second predetermined pressure based upon said subterranean formation and said superjacent formation;

c. comparing said first predetermined pressure with said second predetermined pressure and determining the lesser predetermined pressure; and d. applying a propagation pressure that is no greater than said lesser predetermined pressure.

4. In the method of claim 3 wherein said subterranean formation contains an internal stratum that has mechanical characteristics that differ from those of said subterranean formation and from those of said subjacent and superjacent strata, said internal stratum being subject to being fractured at a lower pressure than said subjacent and superjacent strata, further comprising the steps of:

determining a third predetermined pressure based upon said subterranean formatio and said internal stratum; and selecting as a propagation pressure at a pressure that is greater than said third predetermined pressure but is not greater than said less propagation pressure of step (c) of claim 3.

* * * * *

UNITED STATES PATENT OFFICE
CERTIFICATE OF CORRECTION

Patent No. 3,851,709            Dated  December 3, 1974

Inventor(s) John L. Fitch et al.

It is certified that error appears in the above-identified patent and that said Letters Patent are hereby corrected as shown below:

Column 2, line 24, that portion of the formula reading $W_o$    should read    $w_o$;

line 37, after "unit" insert --area--; line 43, "iva" should read --via--.

Column 4, line 1, that portion of the formula reading $4(1-\nu^2)$    should read    $4(1-\nu^2)_L$    ;

line 14, after "direction of", "th" should read --the--;
line 44, "enginerring" should read --engineering--;
lines 51 and 52, "prdetermined" should read --predetermined--;
line 62, after "which", "differe fro" should read --differ from--.

Column 5, line 4, "thanthe" should read --than the--;
line 23, that portion of the formula reading $4(L1-\nu^2)$    should read    $4(1-\nu^2)_L$    ;

line 27, before "not", "f" should read --if--;
line 33, "ration i" should read --ratio in--.

Column 6, line 33, "formatio" should read --formation--; line 37, before "greater", "not" should read --no--, and "less" should read --lesser--.

Signed and sealed this 1st day of April 1975.

(SEAL)
Attest:

RUTH C. MASON
Attesting Officer

C. MARSHALL DANN
Commissioner of Patents
and Trademarks